United States Patent
Wright et al.

(10) Patent No.: US 8,280,600 B2
(45) Date of Patent: Oct. 2, 2012

(54) PROCESS FOR CALIBRATING AN AUTOMATIC TRANSMISSION

(75) Inventors: David Wright, Howell, MI (US); Pascal Tissot, Gerstheim (FR); Vincent Holtz, Rosenwiller (FR); Nicolas Diss, Strasbourg (FR); Patrick Dromard, Heiligeustin (FR)

(73) Assignee: GM Global Technology Operations LLC, Detroit, MI (US)

( * ) Notice: Subject to any disclaimer, the term of this patent is extended or adjusted under 35 U.S.C. 154(b) by 917 days.

(21) Appl. No.: 12/363,600

(22) Filed: Jan. 30, 2009

(65) Prior Publication Data

US 2009/0197736 A1    Aug. 6, 2009

(30) Foreign Application Priority Data

Feb. 1, 2008 (EP) .................................. 08001886

(51) Int. Cl.
G06F 17/00 (2006.01)
(52) U.S. Cl. ............... 701/67; 701/51; 477/70
(58) Field of Classification Search .......... 701/67, 701/51; 477/39, 45, 79, 117, 118, 176
See application file for complete search history.

(56) References Cited

U.S. PATENT DOCUMENTS

| | | | |
|---|---|---|---|
| 5,029,087 A | 7/1991 | Cowan et al. | |
| 5,145,045 A | 9/1992 | Wakahara | |
| 5,202,833 A | 4/1993 | Fodale | |
| 5,484,354 A * | 1/1996 | Vukovich et al. | 477/174 |
| 5,693,878 A | 12/1997 | Giles | |
| 5,722,519 A | 3/1998 | Kirchhoffer et al. | |
| 2005/0222738 A1 | 10/2005 | Imamura et al. | |
| 2007/0005211 A1 | 1/2007 | Katsumata et al. | |

FOREIGN PATENT DOCUMENTS

| | | |
|---|---|---|
| EP | 0410223 A2 | 1/1991 |
| EP | 0707165 A2 | 4/1996 |
| EP | 1739329 A2 | 1/2007 |
| JP | 2005291345 A | 10/2005 |

OTHER PUBLICATIONS

European Patent Office, European Search Report for Application No. 08001886, dated Jul. 17, 2008.

* cited by examiner

Primary Examiner — James Trammell
Assistant Examiner — Muhammad Shafi
(74) Attorney, Agent, or Firm — Ingrassia Fisher & Lorenz, P.C.

(57) ABSTRACT

A method is provided for calibrating an automatic transmission with a torque converter clutch. In order to avoid that the torque converter clutch still has capacity even if the pressure is commanded to be zero without modifying the behavior of the torque converter clutch behavior of all the production, the torque converter clutch minimum offset transmissions are detected and only on these transmissions the torque converter minimum clamp pressure is decreased by a pressure step and the torque converter clutch coast adapt reference cell is increased.

6 Claims, 1 Drawing Sheet

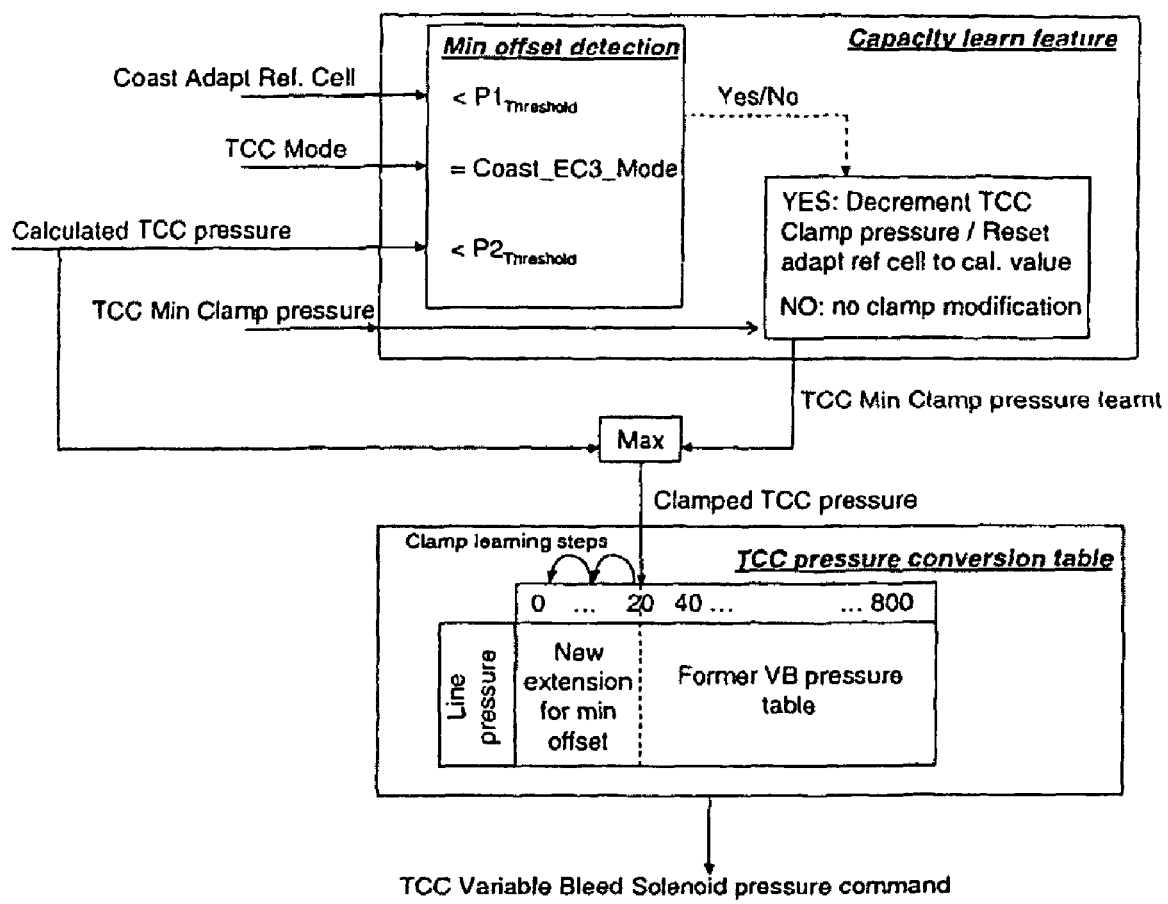

PROCESS FOR CALIBRATING AN AUTOMATIC TRANSMISSION

CROSS-REFERENCE TO RELATED APPLICATION

This application claims priority to European Patent Application No. 08001886.4, filed Feb. 1, 2008, which is incorporated herein by reference in its entirety.

TECHNICAL FIELD

The invention concerns a process for calibrating an automatic transmission with a torque converter clutch.

BACKGROUND

On some transmissions, the torque converter clutch (TCC) could still have capacity even though the pressure is commanded to 0 kPa, which is impacting on the TCC behavior. This problem leads to a TCC chuggle phenomenon at low torque (engine speed waving). It also degrades the performance of the electronically commanded converter clutch (abbreviated EC3, which means that the torque converter clutch is controlled in order to regulate the torque converter) in coast conditions.

An existing calibration solution is a so-called TCC immediate off low torque feature which fixes the chuggle issue by releasing the TCC (off mode), but does not meet the customer expectations on coast EC3 performance and therefore is insufficient.

Another approach is to re-adjust the calibration based on the transmissions that have a minimum TCC offset. This solves coast EC3 performance and chuggle problems on the transmissions with a minimum TCC offset (marginal amount of the production), but damages the TCC behavior of the "nominal offset" transmissions (majority of the production). The transmissions with a minimum TCC offset are those transmissions whose TCC transmits some torque, even if the minimal pressure is commanded.

In EP 1 739 329 A2, a torque converter connecting an engine and a transmission of a vehicle is provided with a lockup clutch and a controller is programmed to increase an engagement force of a lockup clutch under open loop control before shifting to feedback control on the engaging force using a target slip rotation speed. When an engine torque rapidly decreases during open loop control, the controller decreases the engaging force according to a variation amount of the engine output torque, thereby preventing an unintentional sudden engagement of the lockup clutch due to decrease in the engine output torque.

Document JP 2005291345 A describes a control device for an automatic transmission with an input torque detecting means for detecting input torque to a torque converter, a real differential pressure computing means for computing real differential pressure on the basis of the input torque when fastening of a lock-up clutch is concluded, a learning value computing means for computing a difference between a differential pressure command value and the real differential pressure when fastening of the lock-up clutch is concluded as a learning value, and a learning value housing means for storing the learning value in relation to the differential pressure command value. A learning correcting means corrects the differential pressure command value by reading a learning value corresponding to the differential pressure command value from the learning value housing means.

In view of the foregoing, at least one objective of the invention is to avoid that the torque converter clutch still has capacity even if the pressure is commanded to be zero without modifying the behavior of the torque converter clutch behavior of all the production. In addition, other objectives, desirable features, and characteristics will become apparent from the subsequent summary and/or detailed description and the appended claims, taken in conjunction with the accompanying drawings and this background.

SUMMARY

This at least one objective, other objectives, desirable features, and characteristics, are attained according to an embodiment of the invention in that the torque converter clutch minimum offset transmissions are detected and only on these transmissions the torque converter minimum clamp pressure is decreased by a pressure step and the torque converter clutch coast adapt reference cell is increased.

The capacity learn feature according to the invention has been realized on the basis of the following considerations: A torque converter clutch (TCC) minimum offset ("TCC min offset") transmission is characterized by a high level of TCC apply pressure (actual TCC pressure) in any condition for a given VBS pressure command. The torque converter clutch adapts will naturally learn down in order to lower the TCC apply pressure.

BRIEF DESCRIPTION OF THE DRAWINGS

The present invention will hereinafter be described in conjunction with the following drawing figures, wherein like numerals denote like elements, and FIG. 1 shows a schematical representation of an embodiment of the invention.

DETAILED DESCRIPTION

The following detailed description is merely exemplary in nature and is not intended to limit application and uses. Furthermore, there is no intention to be bound by any theory presented in the preceding background or summary or the following detailed description.

As can be seen from FIG. 1, in a first step the torque converter clutch minimum offset (TCC min offset) transmissions are detected. A torque converter clutch (TCC) minimum offset ("TCC min offset") transmission is characterized by a high level of TCC apply pressure (actual TCC pressure) in any condition for a given VBS pressure command. The torque converter clutch adapts will naturally learn down in order to lower the TCC apply pressure.

Thus, the minimum offset is detected when a TCC coast adapt cell (designated by calibration) goes below the threshold P1threshold (calibrated value ~10 kPa).

Then, if the calculated TCC pressure drops below P2threshold (calibrated value ~2 kPa) in coast EC3 mode for a time greater than T2threshold (calibrated value ~0.5 s) while the adapt is below the threshold P1threshold (~10 kPa), the TCC min clamp pressure is decreased by a pressure step. In parallel, the TCC coast adapt reference cell is also reset to the pressure P1threshold+P3threshold (calibrated value+~10 kPa).

A TCC pressure conversion table (not represented) delivers the variable bleed solenoid (VBS) commanded pressure corresponding to a calculated TCC pressure. The known table has been shifted and completed by a new area for the lowest calculated pressures. As a consequence of the shifted table, the coast adapts cells values have been offset in order to keep the same actual TCC pressure for a given calculated TCC pressure. This new extension can only be reached by decreasing the TCC min clamp pressure (initially set at ~20 kPa before learning). Consequently, if a "TCC min offset" transmission is detected, the TCC min clamp pressure will decrease, and then will allow a lower VBS pressure command (new extension table area).

According to an embodiment of the invention, the TCC min clamp will remain at its initial value, so that there are no side effects of the re-calibration of the "TCC min offset" transmissions on the rest of the production. Only "TCC min offset" transmissions will learn a lower TCC min clamp pressure.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method executed by a computer processor for calibrating an automatic transmission with a torque converter clutch, the method comprising the steps of:
   detecting torque converter clutch minimum offset transmissions when a torque converter clutch coast adapt cell decreases below a first pressure threshold;
   when the torque converter clutch minimum offset transmissions are detected and a calculated torque converter clutch pressure drops below a second pressure threshold for a time greater than a time threshold:
   generating a command to decrease a minimum clamp pressure applied to the torque converter clutch by a pressure step; and
   generating a command to increase the torque converter clutch coast adapt reference cell to a new pressure.

2. The method according to claim 1, wherein the first pressure threshold is about 2 kilopascals and the second pressure threshold is about two kilopascals, and wherein the time threshold is about one-half of a second.

3. The method according to claim 1, wherein the torque converter clutch minimum offset transmissions are characterized by a high level of actualy torque converter clutch apply pressure in any condition for a given variable bleed solenoid (VBS) pressure command.

4. The method according to claim 1, wherein the second pressure threshold is less than the first pressure threshold in an electronically commanded converter clutch coast mode in which the torque converter clutch is controlled to regulate a torque converter in coast conditions.

5. The method according to claim 1, wherein the new pressure is the sum of the first pressure threshold and a third pressure threshold.

6. The method according to claim 1, wherein the step of decreasing comprises:
   decreasing the torque converter clutch minimum clamp pressure by the pressure step if the torque converter clutch minimum offset transmissions are detected and the calculated torque converter clutch pressure drops below the second pressure threshold for the time greater than the time threshold while the torque converter clutch coast adapt cell remains below the first pressure threshold.

* * * * *